United States Patent
Alasti et al.

(10) Patent No.: US 12,250,672 B2
(45) Date of Patent: *Mar. 11, 2025

(54) SYSTEMS AND METHODS FOR SCHEDULING WIRELESS DATA TRANSMISSIONS

(71) Applicant: DISH Wireless L.L.C., Englewood, CO (US)

(72) Inventors: Mehdi Alasti, Reston, VA (US); Antti Immonen, Helsinki (FI); Siddhartha Chenumolu, Broadlands, VA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,249

(22) Filed: Jan. 12, 2024

(65) Prior Publication Data

US 2024/0155600 A1 May 9, 2024

Related U.S. Application Data

(63) Continuation of application No. 18/113,525, filed on Feb. 23, 2023, now Pat. No. 11,910,375, which is a
(Continued)

(51) Int. Cl.
*H04W 72/04* (2023.01)
*H04W 72/0453* (2023.01)
(Continued)

(52) U.S. Cl.
CPC ..... *H04W 72/121* (2013.01); *H04W 72/0453* (2013.01); *H04W 72/542* (2023.01); *H04W 72/56* (2023.01)

(58) Field of Classification Search
CPC . H04W 72/121; H04W 72/56; H04W 72/542; H04W 72/0453
(Continued)

(56) References Cited

U.S. PATENT DOCUMENTS

2013/0163541 A1 6/2013 Roh
2017/0188379 A1 6/2017 Shtrom et al.
(Continued)

OTHER PUBLICATIONS

International Preliminary Report on Patentability received for PCT Patent Application No. PCT/US2020/065369, mailed on Jun. 30, 2022, 10 pages.
(Continued)

*Primary Examiner* — Gbemileke J Onamuti
(74) *Attorney, Agent, or Firm* — Jeremiah J. Baunach; Frontier IP Law PLLC

(57) ABSTRACT

A system for scheduling wireless data transmissions divides a band allocated to the mobile service carrier into two overlapping bands. Then each user equipment (UE) of a plurality of UEs that connects to the ground-based network of the mobile service carrier is assigned to one of the two overlapping bands. The system allocates at a given scheduling time, physical resource blocks (PRBs) to UEs up to a maximum number of PRBs available for the particular overlapping frequency band to which the UE is assigned based on a metric for the UE that is a ratio of a downlink channel quality indicator for the UE to the average data rate of the UE at the given time, giving higher priority for PRB allocation to UEs that have a larger metric than other UEs of the plurality of UEs.

15 Claims, 6 Drawing Sheets

Related U.S. Application Data continuation of application No. 17/364,151, filed on Jun. 30, 2021, now Pat. No. 11,617,185, which is a continuation of application No. 16/717,123, filed on Dec. 17, 2019, now Pat. No. 11,082,991.

(51) Int. Cl.
| | | |
|---|---|---|
| *H04W 72/10* | (2009.01) | |
| *H04W 72/12* | (2023.01) | |
| *H04W 72/121* | (2023.01) | |
| *H04W 72/542* | (2023.01) | |
| *H04W 72/56* | (2023.01) | |

(58) Field of Classification Search
USPC .......................................................... 370/329
See application file for complete search history.

(56) References Cited

U.S. PATENT DOCUMENTS

| | | |
|---|---|---|
| 2019/0141742 A1 | 5/2019 | Zhou et al. |
| 2019/0364490 A1 | 11/2019 | Yi et al. |
| 2020/0229206 A1 | 7/2020 | Badic et al. |
| 2023/0209533 A1 | 6/2023 | Alasti et al. |

OTHER PUBLICATIONS

International Search Report and Written Opinion received for PCT Patent Application No. PCT/US2020/065369, mailed on Mar. 19, 2021, 12 pages.
Office Action received for European Application No. 20842402.8, mailed on May 28, 2024, 11 pages.

400

```
Example Sorted List of UEs

1.   UE 2 - Metric value: 5
2.   UE 1 - Metric value: 4
3.   UE 5 - Metric value: 3.5
4.   UE 3 - Metric value: 3
5.   UE 4 - Metric value: 1
.
.
.
```

*Fig. 4*

SYSTEMS AND METHODS FOR SCHEDULING WIRELESS DATA TRANSMISSIONS

TECHNICAL FIELD

The present disclosure relates to mobile wireless communication systems technology, and more particularly relates to improvements in mobile wireless communication systems technology.

BRIEF SUMMARY

Cellular frequencies are the sets of frequency ranges within the ultra high frequency band that have been assigned for cellular-compatible mobile devices, such as mobile phones, to connect to cellular networks. Most mobile networks worldwide use portions of the radio frequency spectrum, allocated to a mobile service, for the transmission and reception of their signals. Since a mobile service is allocated a limited portion of the radio frequency spectrum in which to operate, it is important to use the allocated portion of the radio frequency spectrum more efficiently in order to increase the availability and amount of mobile services on the allocated portion of the radio frequency spectrum at a given time.

For example, if a mobile service carrier is allocated a 7 MHz band of the of the radio frequency spectrum, then, to increase the efficiency of use of the 7 MHz band, the mobile service carrier may implement a more efficient system for dividing the 7 MHz band and scheduling wireless data transmissions between the base station, which may include the cellular tower, and user equipment devices (UEs), e.g., cellular telephones and other wireless devices. Scheduling is the process through which the base station decides which UEs should be given resources to send or receive data at a given time. For example, this may include determining at a given time which UEs to allocate physical resource blocks (PRBs) to in order to operate on the cellular network. A PRB is the smallest element of resource allocation assigned by the base station scheduler. One problem is that many UEs operate using a 5 MHz channel bandwidth, so a significant amount of the 7 MHz bandwidth may be lost.

One potential solution is to implement hardware filters on ground-based network towers to send communications in sub-spectrums of the assigned bandwidth. However, this solution would be expensive and difficult to implement worldwide due to variations in how mobile devices operate in different parts of the world.

An improved solution disclosed herein is to divide the 7 MHz band allocated to the mobile service carrier into two 5 MHz bands, with 3 MHz of overlap between the two 5 MHz bands. Then each UE that connects to a particular ground-based network of the mobile service carrier is assigned to one of the two 5 MHz bands. The additional problem then is how to efficiently schedule, with the two 5 MHz bands overlapping, which UEs should be given resources at a given time to send or receive data. This technical problem is solved as disclosed herein by maintaining in memory an average data rate for each of a plurality of (UEs) that each have data to transfer on either the first overlapping frequency bands or the second overlapping frequency band. The UEs having data to transfer on the first frequency band belong to a first group of UEs and the UEs having data to transfer on the second frequency band belong to a second group of UEs. The system then determines, at a scheduling time t, for each of the UEs, a metric for the UE that is a ratio of a downlink channel quality indicator for the UE to the average data rate of the UE at scheduling time t. The system allocates at scheduling time t, PRBs to UEs belonging to the first group up to a maximum number of PRBs available for the first group, giving higher priority for PRB allocation to UEs that have a larger metric than other UEs of the plurality of UEs. The system also allocates, at scheduling time t, PRBs to UEs belonging to the second group up to a maximum number of PRBs available for the second group, giving higher priority for PRB allocation to UEs that have a larger metric than other UEs of the plurality of UEs.

BRIEF DESCRIPTION OF THE SEVERAL VIEWS OF THE DRAWINGS

FIG. 4 is a representation of an example sorted list of UEs sorted in descending order according to a corresponding determined metric of each UE, according to one embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Unless the context requires otherwise, throughout the specification and which follows, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification, the singular forms "a," "an," and "the" include plural referents unless the content clearly dictates otherwise. It should also be noted that the term "or" is generally employed in its sense including "and/or" unless the content clearly dictates otherwise.

Figure 1:
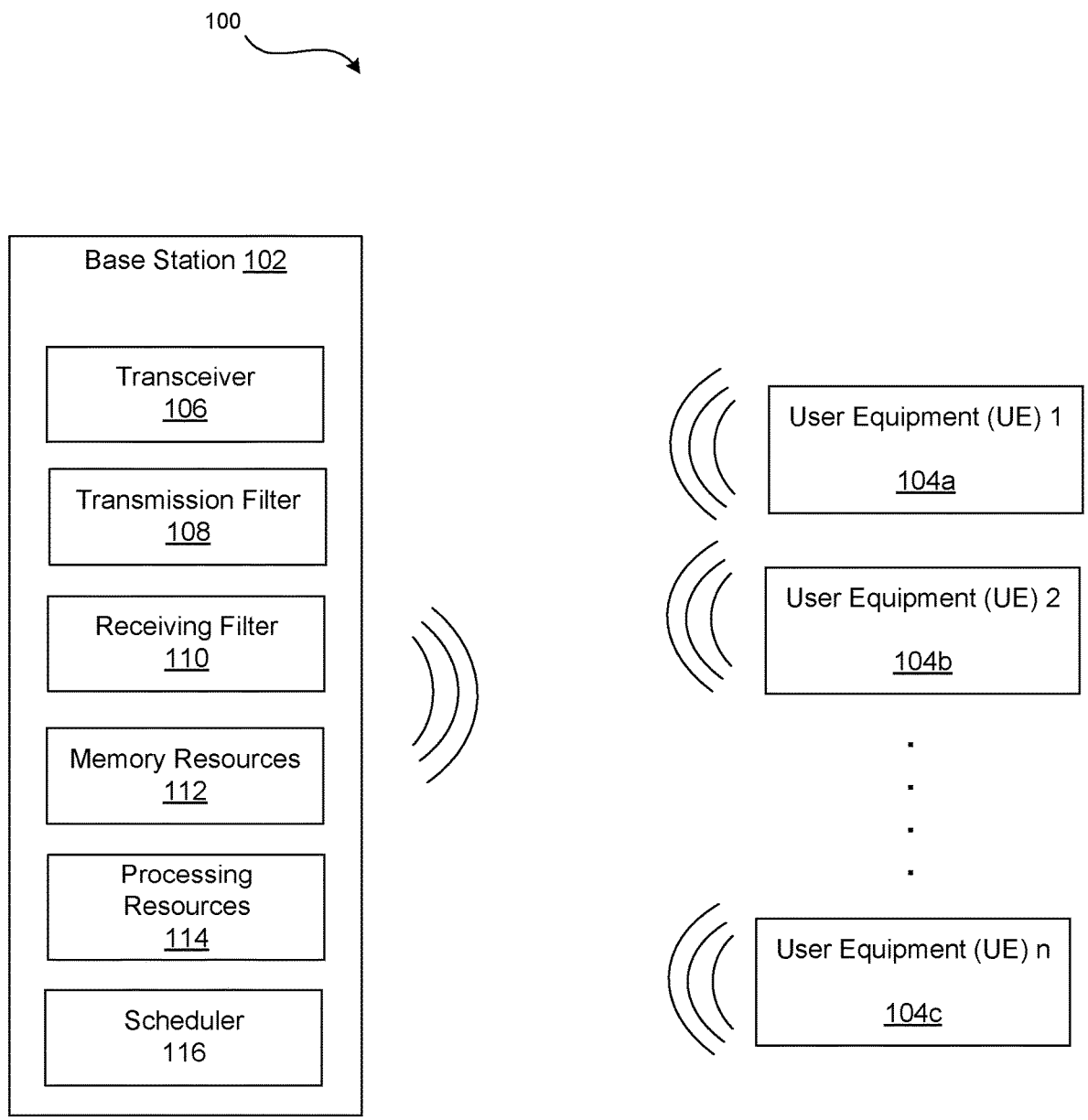
FIG. 1 is a block diagram of an example wireless communication system, according to one embodiment.

FIG. 1 is a block diagram of a wireless communication system 100, according to one embodiment. The wireless communication system 100 includes a base station 102 and a plurality of UEs, which are UE 1 104a, UE 2 104b, . . . UEn 104c (UEs 104a-104n). The base station 102 enables the UEs 104a-104n to communicate with other UEs or to send and receive data via the Internet. UEs 104a-104n represents any number of UEs and there may be fewer or additional UEs in the system 100 than shown in FIG. 1.

The base station 102 includes a transceiver 106, a transmission filter 108, a receiving filter 110, memory resources 112, processing resources 114 and a scheduler 116. Depending on the desired configuration, processing resources 114 may include one more processors of any type including but not limited to a microprocessor (μP), a microcontroller (μC), a digital signal processor (DSP), a central processing unit (CPU), a graphics processing unit (GPU), a Field Programmable Gate Arrays (FPGA), an Application Specific Integrated Circuits (ASIC), or any combination thereof. Processing resources 114 may include one more levels of caching, a processor core and registers 616. An example processor core may include an arithmetic logic unit (ALU), a floating point unit (FPU), a digital signal processing core (DSP Core), or any combination thereof. An example memory controller may also be used with processing resources 114, or in some implementations memory controller may be an internal part of processing resources 114.

Depending on the desired configuration, memory resources 112 may include one or more any type of memory devices including, but not limited to, volatile memory (such as random access memory (RAM), non-volatile memory (such as read-only memory (ROM), flash memory, etc.) or any combination thereof. Memory resources 112 may include storage of an operating system, one or more applications, and program data, including computer-executable instructions implementing operations of the base station 102, including the scheduler 116. In some implementations, the memory resources 112 may store computer-executable instructions that are run by the processing resources 112 to perform the functions as described herein including those described with respect to at least FIGS. 1-6. Program data stored in memory resources 112 may include task related information, such as, without limitation, task data related to executing instructions for performing methods for scheduling wireless data transmission described herein.

The transceiver 106 transmits mobile communication signals to the UEs 104a-104n, to other base stations, and to other communication systems to enable mobile communication and access to the Internet.

The memory resources 112 include one or more computer readable media that store software instructions for establishing a mobile communication network with the base station 102. The processing resources 114 execute the instructions stored in one or more computer readable media of the memory resources 112. The processing resources 114 may execute the instructions that comprise all or part of the scheduler 116. The scheduler 116 may schedule wireless data transmissions between the base station 102 and the UEs 104a-104n. Scheduling is the process through which the base station 102 decides which UEs should be given resources at a given time to send or receive data. For example, this may include determining which and at what time to allocate PRBs to the UEs 104a-104n to operate on the cellular network. A PRB is the smallest element of resource allocation assigned by the scheduler 116 of the base station 116. As set forth in more detail below, executing the software instructions causes the base station 102 to perform the operations disclosed herein.

In one embodiment, the communication system 100 is a 3rd Generation Partnership Project (3GPP) network. 3GPP is a standards organization which develops protocols for mobile telephony. The communication system 100 can include a new radio (NR) fifth generation (5G) network. 5G NR is a radio access technology (RAT) developed by 3GPP for the 5G mobile network. It was designed to be the global standard for the air interface of 5G networks. The 3GPP specification 38 series provides the technical details behind NR, the RAT beyond Long-Term Evolution (LTE), which is a standard for wireless broadband communication for mobile devices and data terminals. In one such example embodiment, the base station 102 comprises or includes a Next generation NodeB (gNB), which is a logical 5G radio node.

The communication system 100 can include other types of networks without departing from the scope of the present disclosure.

3GPP standards have defined specific bandwidths that can be utilized by 5G NR UE. In particular, UEs can utilize bandwidths of 5 MHz, 10 MHz, 15 MHz, 20 MHz, etc. 3GPP standards do not provide for UEs utilizing bandwidths between the specified 5 MHz, 10 MHz, 15 MHz, 20 MHz, etc.

Organizations and companies, such as mobile service carriers, that wish to provide wireless communication network services typically purchase the rights to a particular portion of wireless spectrum. For example, 3GPP standards define a large number of evolved universal mobile telecommunications system (E-UTRA) bands in the radio frequency spectrum. Wireless service providers can purchase, license, or otherwise acquire bandwidth within one or more of these bands and can then provide mobile communication services within that portion of the band.

Bandwidth can be very expensive. In the United States, some organizations pay billions of dollars for bandwidth in various regions. Due to the high cost of bandwidth, it is expensive to purchase an amount of bandwidth that falls between the specific bandwidths that can be utilized by UEs. Organizations typically seek to purchase an amount of bandwidth that corresponds to one of the specified bandwidths that can be utilized by UEs in order to avoid wasting any excess bandwidth. In other words, organizations typically seek to purchase bandwidths of 5 MHz, 10 MHz, 15 MHz, 20 MHz, etc. so that there is not leftover bandwidth between the specified 5 MHz, 10 MHz etc.

Nevertheless, due to the complex licensing, optioning, and purchasing of bandwidth by various organizations, oftentimes organizations end up with rights to utilize an odd amount of bandwidth. As used herein, an odd amount of bandwidth corresponds to an amount of bandwidth that falls between specific bandwidths authorized for UEs by 3GPP standards. In this situation, one possible solution is to simply leave the leftover bandwidth unused. This results in a large spectrum inefficiency. For example, if an organization owns the rights to a bandwidth of 7 MHz, the organization could define a 5 MHz system and leave the remaining 2 MHz of bandwidth unused. This corresponds to approximately 35% of the purchased bandwidth going unused.

The wireless communication system 100 disclosed herein solves this technical problem by dividing the 7 MHz band allocated to the mobile service carrier into two 5 MHz bands, with 3 MHz of overlap between the two 5 MHz bands. Then every UE that connects to a ground-based network of the mobile service carrier may be assigned to one of the two 5 MHz bands. The base station 102 may then maintain in memory resources 112 an average data rate for each of UEs 104a-104n that each have data to transfer on one of the two overlapping frequency bands, including a first frequency band and a second frequency band. The UEs of UEs 104a-104n having data to transfer on the first frequency band belong to a first group of UEs and the UEs of UEs 104a-104n having data to transfer on the second frequency band belong to a second group of UEs. The base station 102 then determines, at a scheduling time t, for each of the UEs 104a-104n, a metric for the UE that is a ratio of a downlink channel quality indicator for the UE to the average data rate of the UE at scheduling time t. The scheduler 116 of the base station 102 allocates at scheduling time t, PRBs to UEs belonging to the first group up to a maximum number of PRBs available for the first group, giving higher priority for PRB allocation to UEs that have a larger metric than other UEs of the plurality of UEs. The scheduler 116 of the base station 102 also allocates, at scheduling time t, PRBs to UEs belonging to the second group up to a maximum number of PRBs available for the second group, giving higher priority for PRB allocation to UEs that have a larger metric than other UEs of the plurality of UEs.

One improvement resulting from utilizing the two overlapping frequency bands and scheduling method as described above is that none of the network bandwidth is wasted. Another improvement resulting from utilizing the two overlapping frequency bands and scheduling method as described above is that none of the two overlapping frequency bands extend into the bandwidth of neighboring networks or systems. Accordingly, the wireless communication system 100 more efficiently uses its full network bandwidth.

Figure 2:
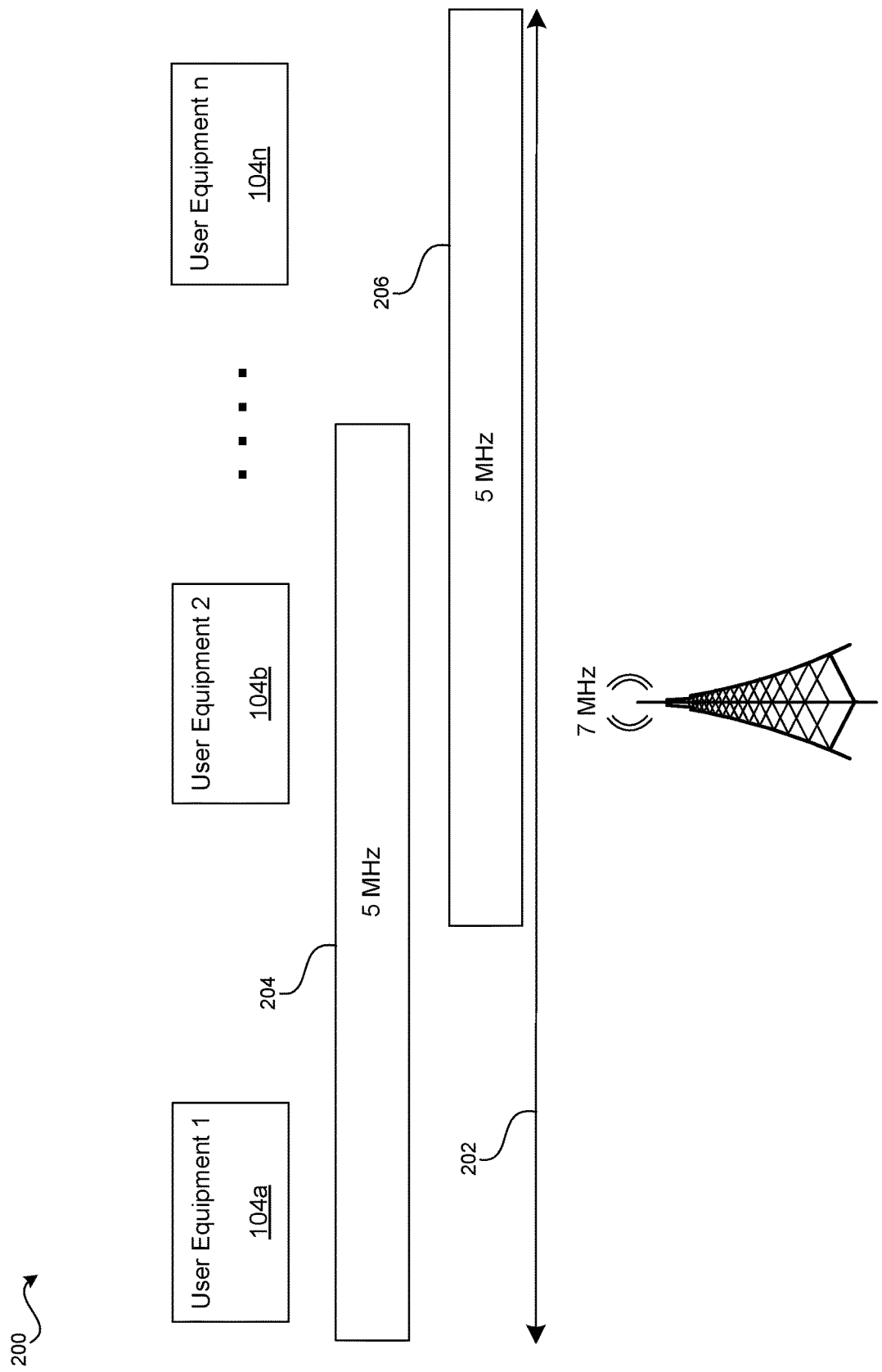
FIG. 2 is a representation of an example 7 MHz band used by the wireless communication system of FIG. 1 divided into two 5 MHz bands with 3 MHz of overlap between the two 5 MHz bands, according to one embodiment.

FIG. 2 is a representation 200 of an example 7 MHz band 202 used by the wireless communication system 100 of FIG. 1 divided into two 5 MHz bands (overlapping band 204 and overlapping band 206) with 3 MHz of overlap between the two 5 MHz bands, according to one embodiment. Each of the UEs 104a-104b operating in the system 100 of FIG. 1 is assigned to one of the two 5 MHz bands (overlapping band 204 and overlapping band 206). In particular, each of the UEs 104a-104b operating in the system 100 of FIG. 1 is assigned to either overlapping band 204 or overlapping band 206.

In one example, in accordance with one embodiment, the wireless communication system 100 has access to 7 MHz of bandwidth 202 in Long Term Evolution (LTE) band 26. LTE is a 4G wireless communications standard developed by the 3GPP. However, the disclosure is not limited to embodiments specific to LTE band 26. Bands of other frequency ranges and other types of frequency bands may be accessed and utilized in various example embodiments. For example, band 26 is under specifications for NR access (i.e., N26), as well, by 3GPP Radio Access Network (RAN) Working Group 4 (RAN WG4 or RAN4). The wireless communication system 100 may have has access to such an N26 frequency band in various embodiments. The wireless communication system 100 defines a first overlapping band 204 and a second overlapping band 206 within the 7 MHz of bandwidth 202. Each of the first overlapping band 204 and a second overlapping band 206 may be a 5 MHz component carrier in accordance with 3GPP standards. However, the component carriers overlap with each other. If the first component carrier begins at the beginning of the network bandwidth and the second component carrier ends at the end of the network bandwidth, then the overlapping bandwidth of the two component carriers is about 3 MHz. As will be set forth in more detail below, the wireless communication system 100 manages the scheduling of wireless data transmissions over the two component carriers such that efficient use is made of network resources.

Continuing with the example in which the wireless communication system 100 has access to 7 MHz of bandwidth 202, in practice, the first overlapping band 204 and the second overlapping band 206 may each include 4.5 MHz of bandwidth, rather than a full 5 MHz. This is because there are guard bands defined at the beginning and the end of the network bandwidth. In particular, a first guard band of 0.25 MHz is established at the beginning of the network bandwidth. A second guard band of 0.25 MHz is established at the end of the available network bandwidth. The result is that there is about 2.5 MHz of overlap between the first overlapping band 204 and the second overlapping band 206.

Figure 3:
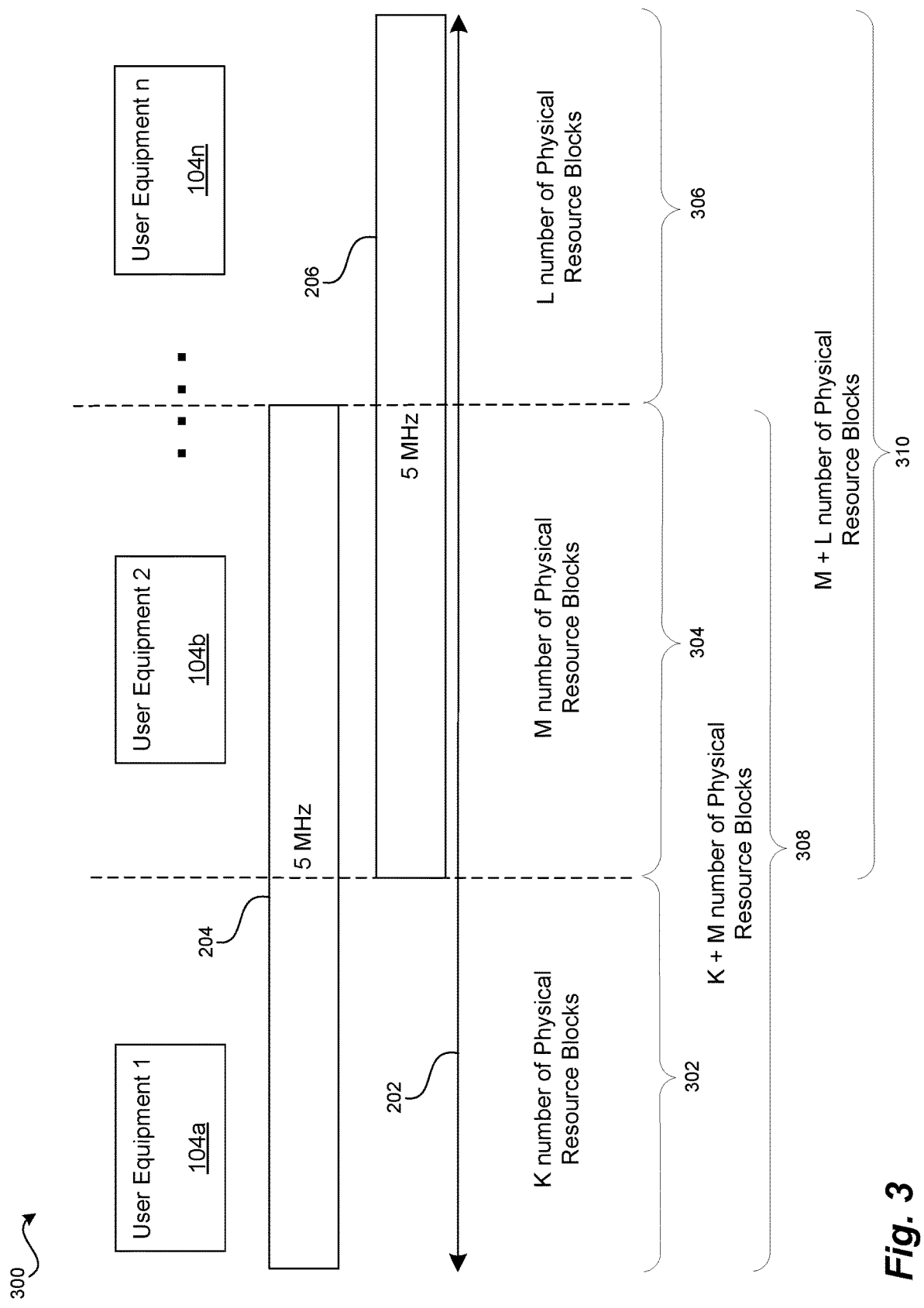
FIG. 3 is a representation of an example of the 7 MHz band divided into two 5 MHz bands of FIG. 2 showing an example total number of physical resource blocks available for allocation to UEs operating in the into two 5 MHz bands, according to one embodiment.

FIG. 3 is a representation 300 of an example of the 7 MHz band 202 divided into two 5 MHz bands of FIG. 2 (overlapping band 204 and overlapping band 206), showing an example total number of physical resource blocks available for allocation to UEs 104a-104n operating in the into two 5 MHz bands, according to one embodiment. In the example embodiment, each of the UEs 104a-104b operating in the system 100 of FIG. 1 is assigned to either overlapping band 204 or overlapping band 206. The UEs of UEs 104a-104b assigned to overlapping band 204 may form a first group of UEs and the UEs of UEs 104a-104b assigned to overlapping band 206 may form a second group of UEs. As shown in the present example, overlapping band 204 has K number of PRBs 302 plus M number of PRBs 304. Overlapping band 206 has M number of PRBs 304 plus L number of PRBs 306. In one example, K=11 PRBs, L=11 PRBs and M=14 PRBs. In this example, the UEs belonging to the first group can only use the first K+M number of PRBs 308, which is a total of 25 PRBs and the UEs belonging to the second group can only use the second K+M number of PRBs 310, which is a total of 25 PRBs.

FIG. 4 is a representation of an example sorted list 400 of UEs sorted in descending order according to a corresponding determined metric of each UE, according to one embodiment.

The system 100 of FIG. 1 determines, at a scheduling time t, for each of the UEs, a metric for the UE that is a ratio of a downlink channel quality indicator for the UE to the average data rate of the UE at scheduling time t. For example, the average data rate at the scheduling time t for each $UE_1$ to $UE_n$ of the plurality of UEs may be calculated according to an exponential filter in which the average data rate for $UE_n$ at scheduling time t (represented by $r_n(t)$) is $r_n(t)=((1-1/T)\ r_n(t-1))+(1/T)\ R_n(t)$, wherein T is a time constant of the exponential filter, wherein $r_n(t-1)$ is an average data rate of $UE_n$ at scheduling time t−1 and $R_n(t)$ is an instantaneous data rate of $UE_n$ at scheduling time t. In this example embodiment, determining, at the scheduling time t, for each of the UEs, the metric for the UE includes determining, by the base station 102, at the scheduling time t, for each $UE_1$ to $UE_n$ of the plurality of UEs, the metric for the $UE_n$ represented by $Metric_n$ such that $Metric_n=cqi_n(t)/r_n(t-1)$, wherein $cqi_n(t)$ is the downlink channel quality indicator for $UE_n$ and $r_n(t-1)$ is the average data rate of $UE_n$ at scheduling time t−1.

The system 100 allocates at scheduling time t, PRBs to UEs belonging to the first group assigned to overlapping frequency band 204 up to a maximum number of PRBs available for the first group (e.g., a maximum number of 25 PRBs), giving higher priority for PRB allocation to UEs that have a larger determined metric value than other UEs of the plurality of UEs. The system 100 also allocates at scheduling time t, PRBs to UEs belonging to the second group of UEs assigned to the overlapping frequency band 206 up to a maximum number of PRBs available for the second group (e.g., a maximum number of 25 PRBs), giving higher priority for PRB allocation to UEs that have a larger metric than other UEs of the plurality of UEs. In one embodiment, the system 100 performs this prioritization by sorting all the UEs of the plurality of UEs with data to transfer, in descending order according to the corresponding determined metric of each UE.

The system 100 then generates a sorted list (e.g., sorted list 400) of all the UEs of the plurality of UEs with data to transfer, in descending order according to the corresponding determined metric of each UE. In the present example shown in the sorted list 400, the system 100 has sorted UE 1, UE 2, UE 3, UE 4 and UE 5 according to their respective example determined metric values. In particular, UE 2 has the largest determined metric value (example metric value of 5), so it is placed at the top if the list 400. US 1 has the next largest determined metric value (example metric value of 4), so it is placed next in the last after UE 1. As can be seen in the sorted list 400, the rest of the example UEs are placed in descending order in the sorted list 400 according to their respective example determined metric values. The sorted list may be re-sorted each time a PRB is allocated or each time a scheduling decision is made by the scheduler 116 of the base station 102.

Figure 5:
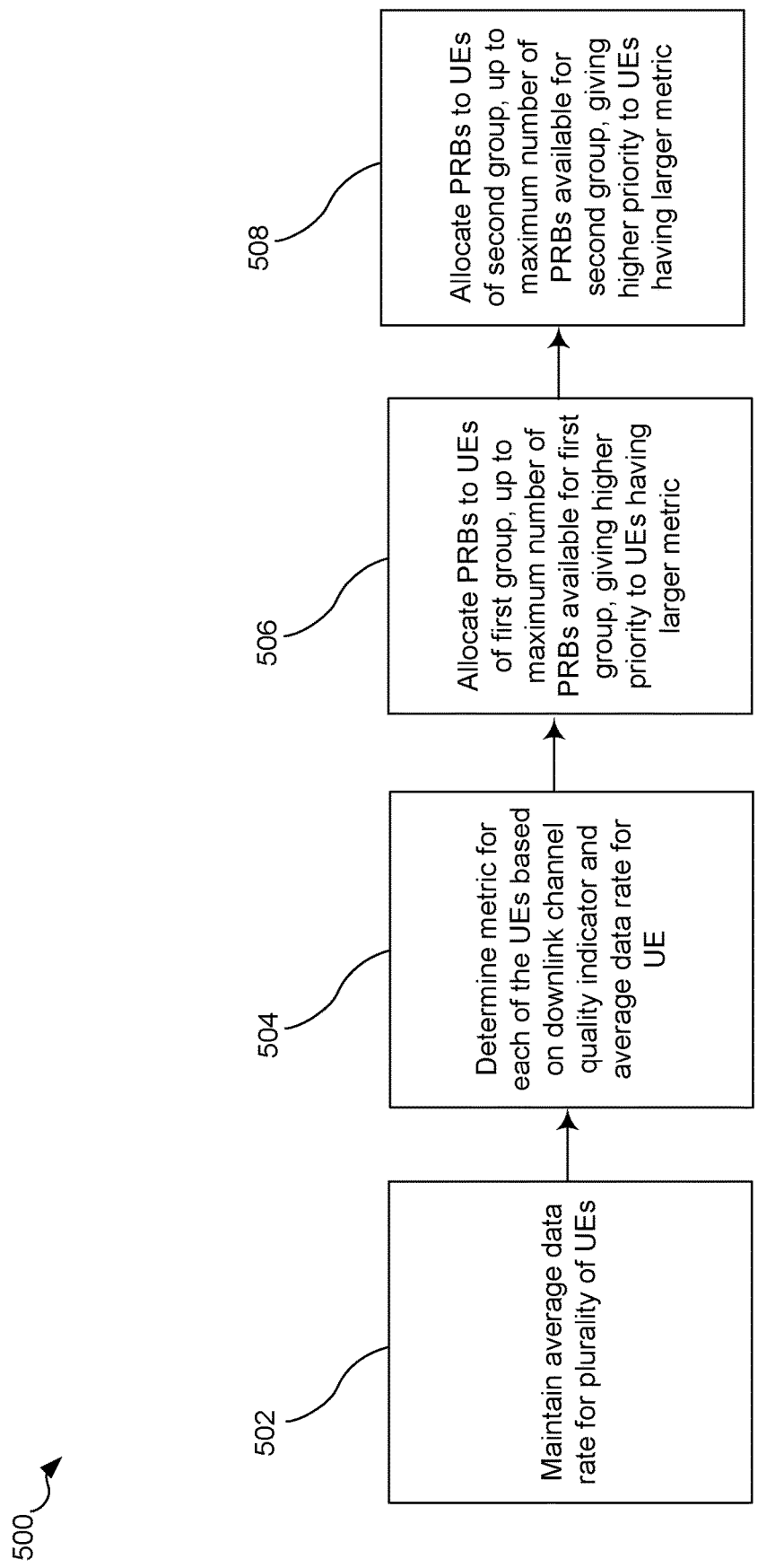
FIG. 5 is a flow diagram of an example technological method for scheduling wireless data transmissions in the system of FIG. 1, according to one embodiment.

FIG. 5 is a flow diagram of an example technological method 500 for scheduling wireless data transmissions in the system of FIG. 1, according to one embodiment.

At 502, the system 100 maintains in memory an average data rate for each of a plurality of user equipment devices (UEs) that each have data to transfer on one of two overlapping frequency bands. The two overlapping frequency bands include at least a first frequency band and a second frequency band. The UEs having data to transfer on the first frequency band belong to a first group of UEs and the UEs having data to transfer on the second frequency band belong to a second group of UEs.

At 504, the system 100 determines at a scheduling time t, for each of the UEs, a metric for the UE that is a ratio of a downlink channel quality indicator for the UE to the average data rate of the UE at scheduling time t.

At 506, the system 100 allocates, at scheduling time t, physical PRBs to UEs belonging to the first group up to a maximum number of PRBs available for the first group, giving higher priority for PRB allocation to UEs that have a larger metric than other UEs of the plurality of UEs.

At 508, the system allocates, at scheduling time t, PRBs to UEs belonging to the second group up to a maximum number of PRBs available for the second group, giving higher priority for PRB allocation to UEs that have a larger metric than other UEs of the plurality of UEs.

In one embodiment, the base station 102 may be or comprise part of a Next generation NodeB (gNB), which is a logical 5G radio node. The gNB may be a 10 MHz radio that only transmits over a 7 MHz band. The system 100 may divide the 7 MHz band into two 5 MHz bands with 3 MHz of overlap between the two 5 MHz bands, wherein the first frequency band is one of the two 5 MHz bands and the second frequency band is the other of the two 5 MHz bands.

The gNB may limit, by a 7 MHz filter, out of band emission of the gNB and filter known reception outside the 7 MHz band.

In one embodiment, included in the maximum number of PRBs available for the first group and the maximum number of PRBs available for the second group are a number of PRBs that are common between the first frequency band and the second frequency band. The number of PRBs that are common between the first frequency band and the second frequency band may be represented by a variable M. The first frequency band may have a first K+M number of PRBs and the second frequency band may have a second M+L number of PRBs, wherein K and L are equal numbers. For example, in one embodiment, K=11, L=11 and M=14.

Before the allocating of the PRBs, the gNB may prepare to allocate the PRBs by determining that the UEs belonging to the first group can only use the first K+M number of PRBs, which is a total of 25 PRBs, and determining that the UEs belonging to the second group can only use the second K+M number of PRBs, which is a total of 25 PRBs. In one example embodiment, the average data rate at the scheduling time t for each $UE_1$ to $UE_n$ of the plurality of UEs may be calculated according to an exponential filter in which the average data rate for $UE_n$ at scheduling time t (represented by $r_n(t)$) is $r_n(t)=((1-1/T)\ r_n(t-1))+(1/T)\ R_n(t)$, wherein T is a time constant of the exponential filter, $r_n(t-1)$ is an average data rate of $UE_n$ at scheduling time t−1 and $R_n(t)$ is an instantaneous data rate of $UE_n$ at scheduling time t. In this example embodiment the gNB may determine, at the scheduling time t, for each $UE_1$ to $UE_n$ of the plurality of UEs, the metric for the $UE_n$ represented by $Metric_n$ such that $Metric_n=cqi_n(t)/r_n(t-1)$, wherein $cqi_n(t)$ is the downlink channel quality indicator for $UE_n$ and $r_n(t-1)$ is the average data rate of $UE_n$ at scheduling time t−1. The downlink channel quality indicator, for each of the UEs, may be generated based on downlink channel quality information received from the corresponding UE.

Figure 6:
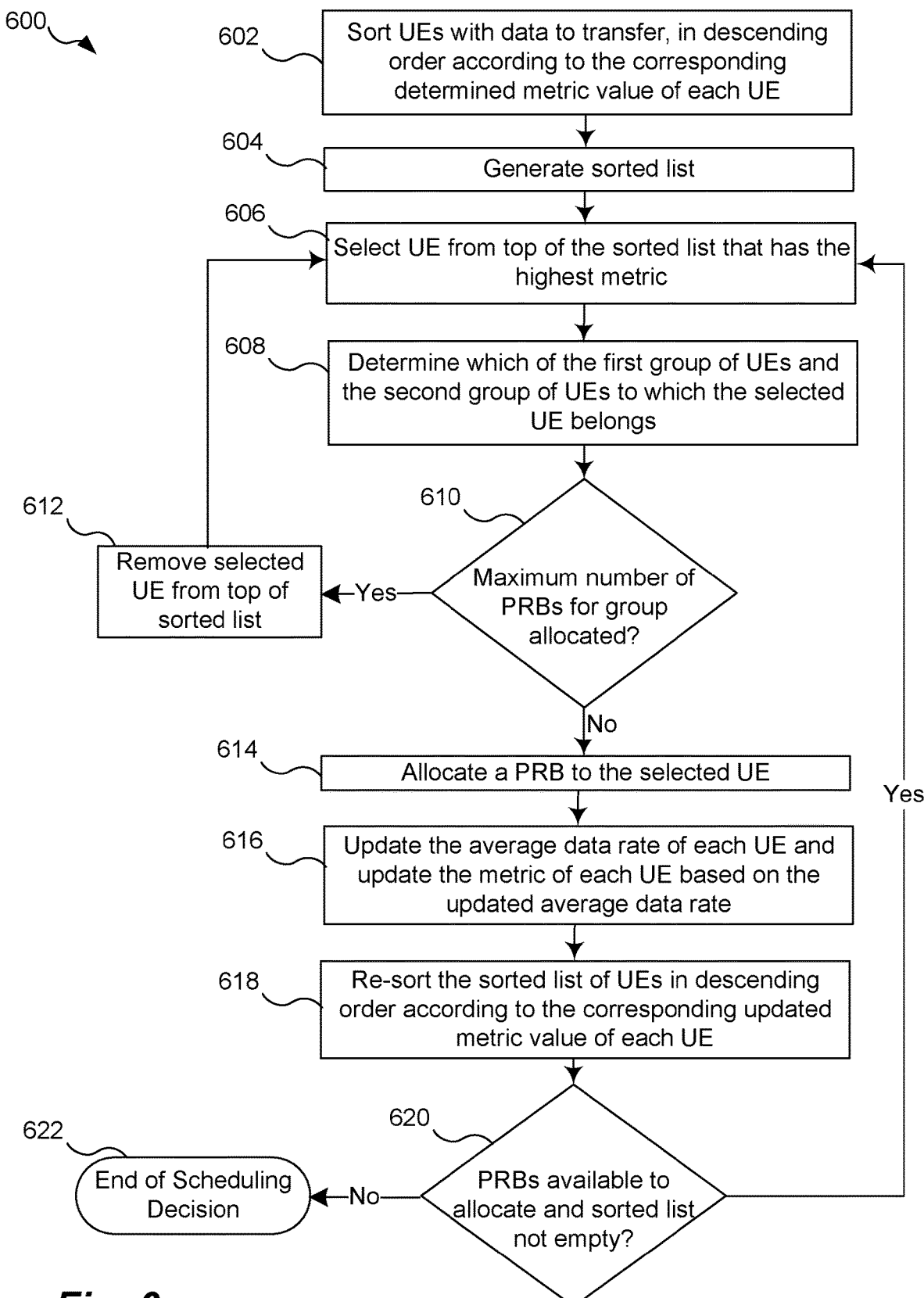
FIG. 6 is a flow diagram of an example technological method for allocation of PRBs to UEs useful in the method for scheduling wireless data transmissions of FIG. 5, according to one embodiment.

FIG. 6 is a flow diagram of an example technological method 600 for allocation of PRBs to UEs useful in the method for scheduling wireless data transmissions of FIG. 5, according to one embodiment.

At 602, the base station 102 may sort all the UEs of the plurality of UEs with data to transfer, in descending order according to the corresponding determined metric of each UE of the plurality of UEs with data to transfer.

At 604, the base station 102 may generate a sorted list of all the UEs of the plurality of UEs with data to transfer, in descending order according to the corresponding determined metric of each UE of the plurality of UEs with data to transfer.

At 606, the base station 102 may select a UE from a top of the sorted list that has the highest metric.

At 608, the base station 102 may determine which of the first group of UEs and the second group of UEs to which the selected UE with the highest metric belongs.

At 610, the base station 102 may determine whether a maximum number of PRBs available for the determined group to which the selected UE belongs have been allocated already (e.g., as the case may be, the maximum number of K+M PRBs have been allocated for the first group or the maximum number of M+L PRBs have been allocated for the second group). If it is determined that a maximum number of PRBs available for the determined group to which the selected UE belongs have been allocated already, then the process proceeds to 612. If it is determined that a maximum number of PRBs available for the determined group to which the selected UE belongs have not been allocated already, then the process proceeds to 614.

At 612, the base station 102 may remove the selected UE from the top of the sorted list if it had been determined the maximum number of PRBs available for the determined group to which the selected UE belongs have all been allocated already. The process then proceeds to back 606 in which the base station 102 selects a UE from the top of the sorted list that has the highest metric.

At 614, the base station 102 may allocate a PRB to the selected UE with the highest metric if it had been determined a maximum number of PRBs available for the determined group to which the selected UE belongs have not all been allocated already. In conjunction with the allocation of the PRB, the base station may increment a counter indicating a current total number of PRBs assigned to UEs belonging to the determined group to which the selected UE belongs and also increment a counter indicating the total number of PRBs allocated to the selected UE.

At 616, the base station 102 may update the average data rate of each UE of the plurality of UEs and the metric for each UE of the plurality of UEs based on the updated average data rate of each UE of the plurality of UEs. The base station 102 may maintain in memory resources 112 an average data rate for each of the plurality of UEs that each have data to transfer on one of the two overlapping frequency bands. Updating the average data rate of each UE of the plurality of UEs may include, for each UE of the plurality of UEs, updating the average data rate of the UE according to the exponential filter described earlier, wherein the average data rate of the selected UE at scheduling time $t-1$ is updated to be equal to $r_n(t-1)+B_n(t)$, wherein $B_n(t)$ represents an instantaneous data rate associated with a downlink channel quality indicator for the selected UE.

At 618, the base station 102 may re-sort, based on the updated average data rate and updated metric of each UE of the plurality of UEs, the sorted list of all the UEs of the plurality of UEs with data to transfer, in descending order according to the updated metric of each UE.

At 620, the base station 102 may determine whether there are any remaining PRBs available to allocate and whether the sorted list is empty. If it is determined that there are any remaining PRBs available to allocate and it is determined that the sorted list is not empty, then the process proceeds back to 606 where the base station may again select a UE from the top of the sorted list that has the highest metric. If it is determined that there are not any remaining PRBs available to allocate or it is determined that the sorted list is not empty, then the process proceeds to 622, which is the end of the current scheduling decision. The base station, may then communicate with the plurality of UEs using the PRBs allocated to the plurality of UEs, enabling the plurality of UEs to transfer data on corresponding PRBs allocated to the plurality of UEs. In one example embodiment, the base station 102 may be or include a Next generation NodeB (gNB) and comprises part of a 5G wireless telecommunications base station.

There is little distinction left between hardware and software implementations of aspects of systems. The use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes, systems, or other technologies are deployed. For example, if an implementer determines that speed and accuracy are paramount, the implementer may opt for a mainly hardware or firmware vehicle. If flexibility is paramount, the implementer may opt for a mainly software implementation. Yet again, alternatively, the implementer may opt for some combination of hardware, software, with or without firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flash drives, a hard disk drive, a Compact Disc (CD), a Digital Video Disk (DVD), a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems of mobile wireless communication systems. That is, at least a portion of the devices and/or processes described herein can be integrated into a data processing system of a mobile wireless communication system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops. A data processing system may be implemented utilizing any suitable commercially available components, such as those typically found in data computing/communication and/or network computing/communication systems.

The above description of illustrated embodiments, including what is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary communication service provider systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as flash drives, hard disk drives, CD ROMs, and computer memory; and other non-transitory computer-readable storage media.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A technological method for scheduling wireless data transmissions for a plurality of user equipment devices (UEs) that each have data to transfer on one of two overlapping frequency bands including a first frequency band and a second frequency band, the UEs having data to transfer on the first frequency band belonging to a first group of UEs and the UEs having data to transfer on the second frequency band belonging to a second group of UEs, the method comprising:
   allocating at scheduling time t, by at least one processor, physical resource blocks (PRBs) to UEs belonging to the first group up to a maximum number of PRBs available for the first group, giving higher priority for PRB allocation to UEs that have a larger priority metric than other UEs of the plurality of UEs; and
   allocating at scheduling time t, by at least one processor, PRBs to UEs belonging to the second group up to a maximum number of PRBs available for the second group, giving higher priority for PRB allocation to UEs that have a larger priority metric than other UEs of the plurality of UEs.

2. The method of claim 1 wherein the larger priority metric is based on a downlink channel quality indicator and the downlink channel quality indicator is a parameter of Long Term Evolution (LTE) Radio Access Technology (RAT).

3. The method of claim 1 wherein the larger priority metric is based on a downlink channel quality indicator and the downlink channel quality indicator is a parameter of Fifth Generation (5G) New Radio (NR) Radio Access Technology (RAT).

4. The method of claim 1 wherein the at least one processor is at least one processor of a Next generation NodeB (gNB), which is a logical 5G radio node.

5. The method of claim 4 further comprising dividing, by at least one processor, a band over which the gNB transmits into two bands with overlap between the two bands, wherein the first frequency band is one of the two bands which overlap and the second frequency band is the other of the two bands which overlap.

6. The method of claim 5 wherein the gNB is a 10 MHz radio that only transmits over a 7 MHz band and wherein the dividing includes dividing the 7 MHz band into two 5 MHz bands with 3 MHz of overlap between the two 5 MHz bands, wherein the first frequency band is one of the two 5 MHz bands and the second frequency band is the other of the two 5 MHz bands.

7. The method of claim 6 further comprising limiting, by a 7 MHz filter, out of band emission of the gNB and filtering known reception outside the 7 MHz band.

8. The method of claim 6 wherein included in the maximum number of PRBs available for the first group and the maximum number of PRBs available for the second group are a number of PRBs that are common between the first frequency band and the second frequency band, the a number of PRBs that are common between the first frequency band and the second frequency band represented by a variable M.

9. The method of claim 8 wherein the first frequency band has a first K+M number of PRBs and the second frequency band has a second M+L number of PRBs, wherein K and L are equal numbers.

10. The method of claim 9 wherein K=11, L=11 and M=14.

11. The method of claim 10 further comprising, before the allocating of the PRBs, the gNB preparing to allocate the PRBs by at least:
   determining the UEs belonging to the first group can only use the first K+M number of PRBs, which is a total of 25 PRBs; and determining the UEs belonging to the second group can only use the second K+M number of PRBs, which is a total of 25 PRBs.

12. A system for scheduling wireless data transmissions comprising:
   at least one computer processor; and
   at least one memory coupled to the at least one computer processor, the at least one memory having computer-executable instructions stored thereon that, when executed by the at least one computer processor, cause the at least one computer processor to perform:
      maintaining in memory data regarding each of a plurality of user equipment devices (UEs) that each have data to transfer on one of two overlapping frequency bands including a first frequency band and a second frequency band, the UEs having data to transfer on the first frequency band belonging to a first group of UEs and the UEs having data to transfer on the second frequency band belonging to a second group of UEs;
      allocating at scheduling time t, physical resource blocks (PRBs) to UEs belonging to the first group up to a maximum number of PRBs available for the first group, giving higher priority for PRB allocation to UEs belonging to the first group that have a larger priority metric than other UEs belonging to the first group; and
      allocating at scheduling time t, PRBs to UEs belonging to the second group up to a maximum number of PRBs available for the second group, giving higher priority for PRB allocation to UEs belonging to the second group that have a larger priority metric than other UEs belonging to the second group.

13. The system of claim 12 wherein the at least one computer processor is at least one processor of a Next generation NodeB (gNB), which is a logical 5G radio node and wherein the gNB is a 10 MHz radio that only transmits over a 7 MHz band and wherein the computer-executable instructions, when executed by the at least one computer processor, further cause the at least one computer processor to perform:
   dividing the 7 MHz band into two 5 MHz bands with 3 MHz of overlap between the two 5 MHz bands, wherein the first frequency band is one of the two 5 MHz bands and the second frequency band is the other of the two 5 MHz bands.

14. A non-transitory computer-readable storage medium having computer-executable instructions stored thereon that, when executed by at least one processor, cause the at least one processor to perform:
   maintaining in memory data regarding a plurality of user equipment devices (UEs) that each have data to transfer on one of two overlapping frequency bands including a first frequency band and a second frequency band, the UEs having data to transfer on the first frequency band belonging to a first group of UEs and the UEs having data to transfer on the second frequency band belonging to a second group of UEs;
   allocating at scheduling time t, physical resource blocks (PRBs) to UEs belonging to the first group up to a maximum number of PRBs available for the first group, giving higher priority for PRB allocation to UEs belonging to the first group that have a larger priority metric than other UEs belonging to the first group; and
   allocating at scheduling time t, PRBs to UEs belonging to the second group up to a maximum number of PRBs available for the second group, giving higher priority for PRB allocation to UEs belonging to the second group that have a larger priority metric than other UEs belonging to the second group.

15. The computer-readable storage medium of claim 14 wherein the at least one processor is at least one processor of a Next generation NodeB (gNB), which is a logical 5G radio node and wherein the gNB is a 10 MHz radio that only transmits over a 7 MHz band and wherein the computer-executable instructions, when executed by the at least one processor, further cause the at least one processor to perform:
   dividing the 7 MHz band into two 5 MHz bands with 3 MHz of overlap between the two 5 MHz bands, wherein the first frequency band is one of the two 5 MHz bands and the second frequency band is the other of the two 5 MHz bands.

* * * * *